(12) United States Patent
Hafezinasab et al.

(10) Patent No.: US 11,929,632 B2
(45) Date of Patent: Mar. 12, 2024

(54) ON-BOARD CHARGER SYSTEM WITH INTEGRATED AUXILIARY POWER SUPPLY

(71) Applicant: LiveWire EV, LLC, Milwaukee, WI (US)

(72) Inventors: Hamidreza Hafezinasab, Sunnyvale, CA (US); William Albert Stinnett, Sunnyvale, CA (US)

(73) Assignee: LiveWire EV, LLC, Milwaukee, WI (US)

(*) Notice: Subject to any disclaimer, the term of this patent is extended or adjusted under 35 U.S.C. 154(b) by 202 days.

(21) Appl. No.: 17/159,298

(22) Filed: Jan. 27, 2021

(65) Prior Publication Data

US 2022/0239111 A1 Jul. 28, 2022

(51) Int. Cl.
| | |
|---|---|
| *H02J 7/00* | (2006.01) |
| *H02J 7/06* | (2006.01) |
| *H02M 3/335* | (2006.01) |
| H02M 7/219 | (2006.01) |
| H02P 27/06 | (2006.01) |

(52) U.S. Cl.
CPC ............ *H02J 7/007* (2013.01); *H02J 7/0042* (2013.01); *H02J 7/06* (2013.01); *H02M 3/33592* (2013.01); H02J 2207/20 (2020.01); H02M 7/219 (2013.01); H02P 27/06 (2013.01)

(58) Field of Classification Search
CPC ...... H02J 7/00; H02J 7/10; H02J 7/06; H02M 7/28; H02M 7/219; H02M 7/21; H02M 3/335
See application file for complete search history.

(56) References Cited

U.S. PATENT DOCUMENTS

| | | |
|---|---|---|
| 8,035,247 B2 | 10/2011 | Ichikawa |
| 8,242,627 B2 | 8/2012 | Ichikawa |
| 8,482,255 B2 | 7/2013 | Crombez |
| 8,502,412 B2 | 8/2013 | Ang et al. |
| 8,615,341 B2 | 12/2013 | Kitanaka |
| 8,736,101 B2 | 5/2014 | Masuda et al. |
| 8,907,622 B2 | 12/2014 | Itagaki et al. |
| 9,007,001 B2 | 4/2015 | Sugiyama et al. |

(Continued)

FOREIGN PATENT DOCUMENTS

| | | | |
|---|---|---|---|
| JP | H08107606 A | 4/1996 | |
| WO | WO2017143051 A1 | 8/2017 | |
| WO | WO-2020227921 A1 * | 11/2020 | ............ H02J 7/0013 |

*Primary Examiner* — Richard Isla
*Assistant Examiner* — Sadia Kousar
(74) *Attorney, Agent, or Firm* — Michael Best & Friedrich LLP

(57) ABSTRACT

A charger including a charging interface and a converter coupled to the charging interface. The converter includes a first plurality of switching transistors coupled to the charging interface and a transformer including a primary winding, a secondary winding, and an auxiliary winding. The primary winding is coupled to the first plurality of switching transistors. A second plurality of switching transistors is coupled between the secondary winding and a battery interface. An auxiliary system interface is coupled to the auxiliary winding. A controller is configured to control the first plurality of switching transistors and the second plurality of switching transistors to generate a first signal at the battery interface and a second signal at the auxiliary system interface.

19 Claims, 3 Drawing Sheets

(56) References Cited

U.S. PATENT DOCUMENTS

| | | | |
|---|---|---|---|
| 9,090,177 B2 | 7/2015 | Okura | |
| 9,172,252 B2 | 10/2015 | Sugiyama | |
| 9,240,699 B2 * | 1/2016 | Cho | B60L 53/22 |
| 9,610,848 B2 | 4/2017 | Okumura | |
| 9,614,453 B2 * | 4/2017 | Dai | H02M 3/01 |
| 9,744,857 B2 | 8/2017 | Eifert et al. | |
| 10,046,656 B2 | 8/2018 | Kim et al. | |
| 10,173,614 B2 | 1/2019 | Kamachi | |
| 2008/0316774 A1 * | 12/2008 | Ito | B60W 10/26 |
| | | | 363/17 |
| 2012/0049794 A1 | 3/2012 | Han et al. | |
| 2012/0146406 A1 | 6/2012 | Lin et al. | |
| 2014/0015485 A1 | 1/2014 | Mitsutani et al. | |
| 2015/0042159 A1 | 2/2015 | Kim et al. | |
| 2016/0288664 A1 | 10/2016 | Biagini et al. | |
| 2017/0174099 A1 | 6/2017 | Kikkawa et al. | |
| 2020/0067409 A1 * | 2/2020 | Li | H02M 1/08 |
| 2022/0045619 A1 * | 2/2022 | Jia | H02J 50/12 |

* cited by examiner

ON-BOARD CHARGER SYSTEM WITH INTEGRATED AUXILIARY POWER SUPPLY

FIELD

Embodiments described herein relate to battery charging systems and, more particularly, relate to a charging system on-board a vehicle for charging a battery included in the vehicle. The charging system charges the battery from a power supply and provides an auxiliary power supply using power from the power supply or the battery.

SUMMARY

Typical power supply systems for an electric vehicle include a charging module for charging a primary battery of the vehicle from an external power source and a separate power supply module for generating an auxiliary power supply voltage, wherein the auxiliary power supply voltage is different than the primary battery voltage and may be used to power accessories of the vehicle. These separate modules increase the footprint and cost of the power supply system.

Accordingly, embodiments described herein provide an on-board charging system with an integrated auxiliary power supply and methods of operating the same.

For example, one embodiment provides a charger including a charging interface and a converter coupled to the charging interface. The converter includes a first plurality of switching transistors coupled to the charging interface and a transformer including a primary winding, a secondary winding, and an auxiliary winding. The primary winding is coupled to the first plurality of switching transistors. A second plurality of switching transistors is coupled between the secondary winding and a battery interface. An auxiliary system interface is coupled to the auxiliary winding. A controller is configured to control the first plurality of switching transistors and the second plurality of switching transistors to generate a first signal at the battery interface and a second signal at the auxiliary system interface.

Another embodiment provides a vehicle including a charging interface and a converter coupled to the charging interface. The converter includes a first plurality of switching transistors coupled to the charging interface and a transformer including a primary winding, a secondary winding, and an auxiliary winding. The primary winding is coupled to the first plurality of switching transistors. A second plurality of switching transistors is coupled between the secondary winding and a battery interface. An auxiliary system interface is coupled to the auxiliary winding. A battery is coupled to the battery interface. An inverter is coupled to the battery. A motor is coupled to the inverter. A controller is configured to control the first plurality of switching transistors and the second plurality of switching transistors to generate a first signal at the battery interface and a second signal at the auxiliary system interface.

Yet another embodiment provides a method including controlling, with a controller, a first plurality of switching transistors coupled to a primary winding of a transformer and a second plurality of switching transistors coupled between a secondary winding of the transformer and a battery interface to generate a first signal at the battery interface and a second signal at an auxiliary system interface coupled to an auxiliary winding of the transformer.

Other features and aspects will become apparent by consideration of the following detailed description and accompanying drawings.

DETAILED DESCRIPTION

Figure 1:
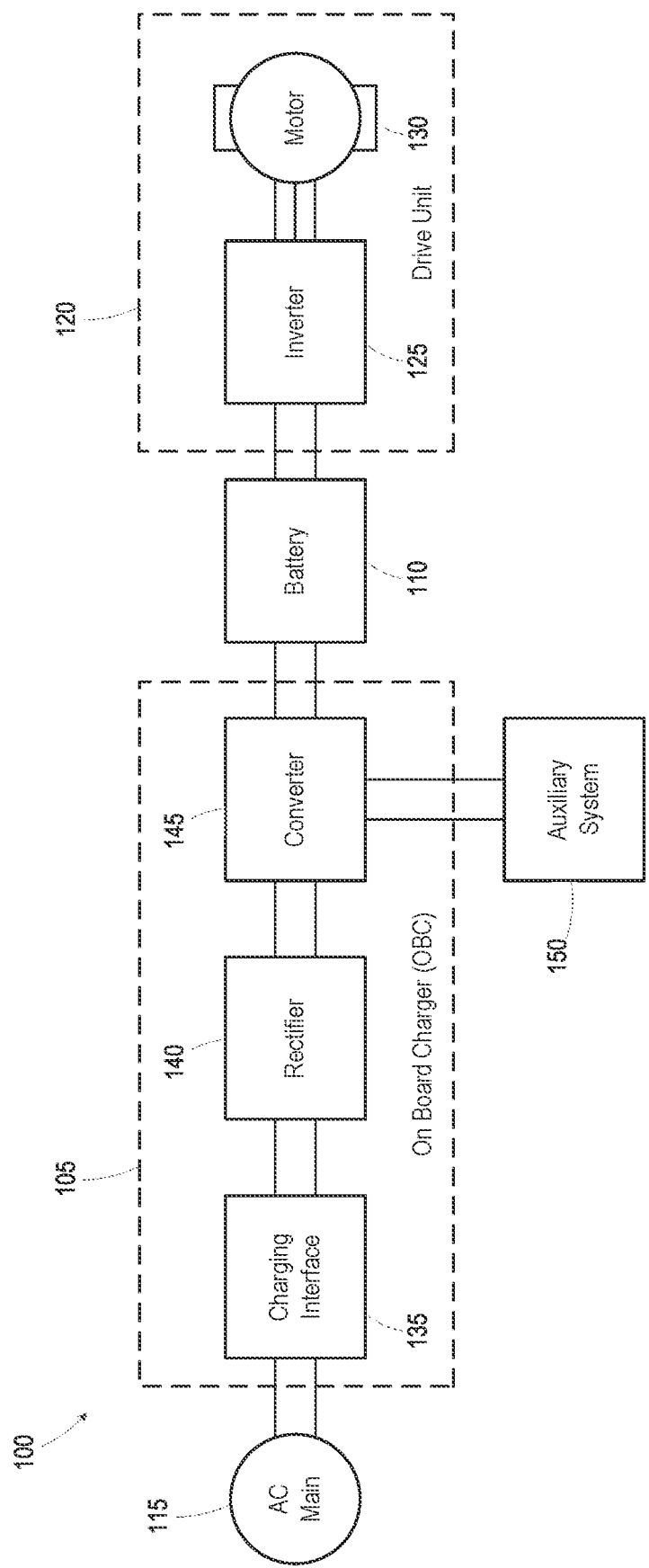
FIG. 1 is a block diagram of a power supply system according to one embodiment.

One or more embodiments are described in the following description and illustrated in the accompanying drawings. These embodiments are not limited to the specific details provided herein and may be modified in various ways. Furthermore, other embodiments may exist that are not described herein. Also, the functionality described herein as being performed by one component may be performed by multiple components in a distributed manner. Likewise, functionality described herein as being performed by multiple components may be consolidated and performed by a single component. Similarly, a component described as performing particular functionality may also perform additional functionality not described herein. For example, a device or structure that is "configured" in a certain way is configured in at least that way but may also be configured in ways that are not listed. Furthermore, some embodiments described herein may include one or more electronic processors configured to perform the described functionality (or portions thereof) by executing instructions stored in non-transitory, computer-readable medium. Similarly, embodiments described herein may be implemented as non-transitory, computer-readable medium storing instructions executable by one or more electronic processors to perform the described functionality. As used in the present application, "non-transitory, computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Moreover, relational terms such as first and second, top and bottom, and the like may be used herein solely to distinguish one entity or action from another entity or action without necessarily requiring or implying any actual such relationship or order between such entities or actions.

FIG. 1 is a block diagram of a power supply system 100 according to one embodiment. The power supply system 100 includes a charger 105 for charging a battery 110 using power from a power source 115. The battery 110 provides power to a drive unit 120. In some embodiments, the drive unit 120 includes an inverter 125 for generating an alternating current power signal for driving a motor 130. However, in some embodiments, the charger 105 and battery 110 may be used to power a different type of load. For example, although not illustrated in FIG. 1, the power supply system 100 may be included in a vehicle, such as a passenger vehicle, a motorcycle, a truck, a bus, or the like, where the drive unit 120 drives one or more wheels of the vehicle. Similarly, the battery 110 in this situation can be considered a primary battery of the vehicle used to drive or move the vehicle. However, in some embodiments, the drive unit 120 drives other components of a vehicle and the power supply system 100 described herein is not limited to supplying power to a motor 130 as illustrated in the example embodiment of FIG. 1.

The charger 105 includes a charging interface 135 coupled to the power source 115, a rectifier 140, and a converter 145 connected to the battery 110. The rectifier 140 converts a power supply signal, such as an alternating current (AC) signal, from the power source 115, which may be external to the vehicle when the power supply system 100 is included in a vehicle as described above, to a direct current (DC) signal. The converter 145 provides isolation between the power source 115 and the battery 110 and generates a charging signal for the battery 110. The converter 145 also generates an auxiliary power supply signal for an auxiliary system 150 and isolates the auxiliary system 150 from the power source 115. In some embodiments, where the power supply system 100 is implemented in a vehicle, the auxiliary system 150 includes loads such as, for example, a radio, a navigation system, a heating unit, an instrument cluster, control electronics for the vehicle, and the like. In some embodiments, the auxiliary system 150 includes an auxiliary battery distinct from the battery 110.

Figure 2:
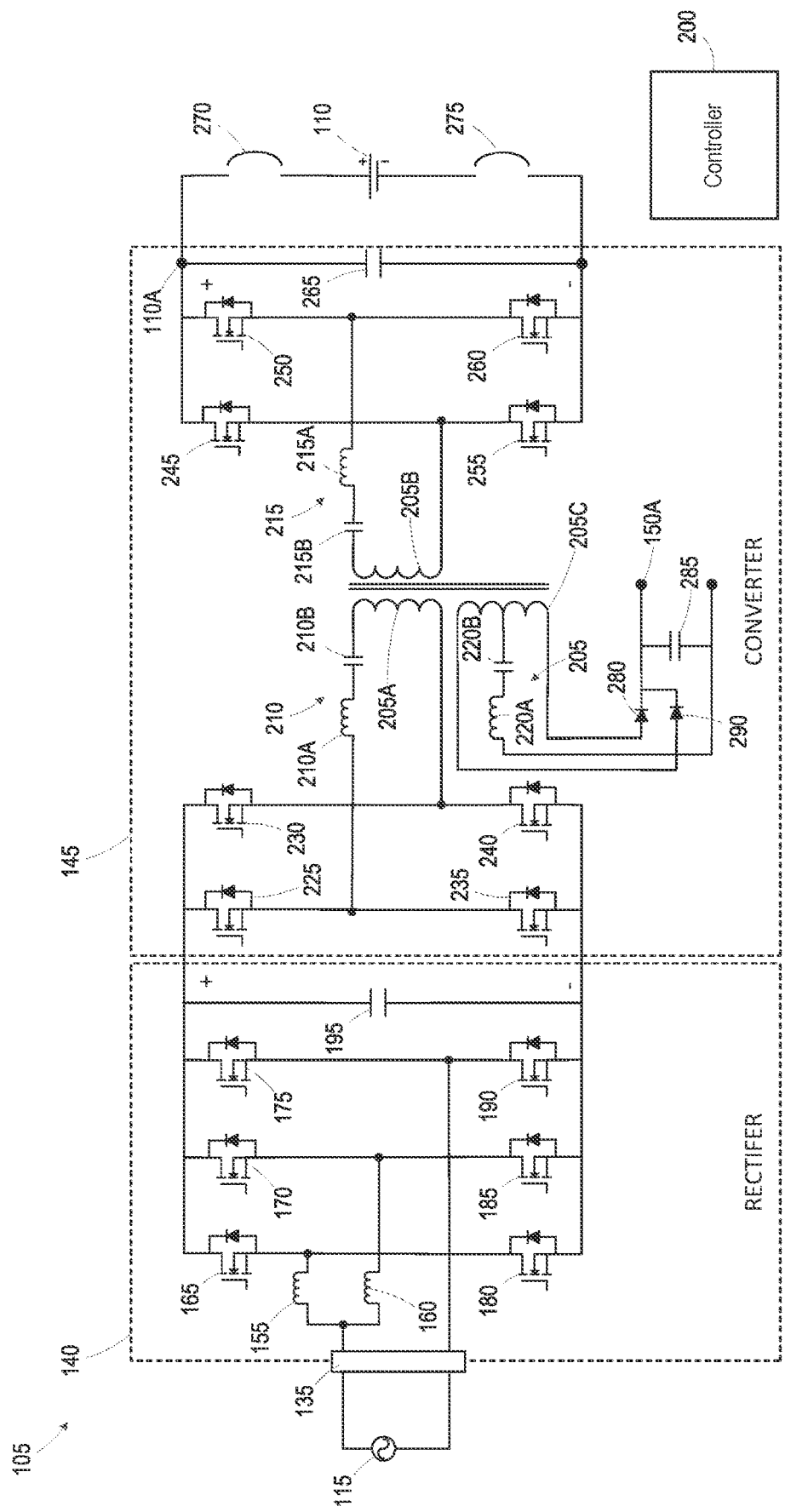
FIG. 2 is a circuit diagram of one embodiment of a charger included in the power supply system of FIG. 1 for charging a battery and providing an auxiliary power supply.

FIG. 2 is a circuit diagram of one embodiment of the charger 105 included in the power supply system 100 of FIG. 1. Power from the power source 115 is received at the charging interface 135 and provided to the rectifier 140. In some embodiments, the rectifier 140 is an active power factor correction rectifier. Other types of rectifiers, such as passive rectifiers, bridge rectifiers, or the like, may be used. As one example embodiment, the rectifier 140 includes inductors 155 and 160, switching transistors 165, 170, 175, 180, 185, and 190, and an intermediate bus capacitor 195. A controller 200 generates switching signals for the switching transistors 165, 170, 175, 180, 185, and 190 for power factor correction of the AC power from the power source 115 and to generate a DC voltage on the intermediate bus capacitor 195. For ease of illustration, connections between the controller 200 and the gate terminals of the switching transistors 165, 170, 175, 180, 185, and 190 are omitted. Also, feedback signals, such as voltage across the intermediate bus capacitor 195 and input current used by the controller 200 are also omitted.

In general, the inductors 155 and 160 store energy from the power source 115 and the controller 200 controls the switching transistors 165, 170, 175, 180, 185, and 190 to transfer power to the intermediate bus capacitor 195, thereby controlling the DC voltage generated across the intermediate bus capacitor 195. The controller 200 controls the duty cycle and switching frequency of the switching signals to control the current signal applied to the intermediate bus capacitor 195. In some embodiments, the power source 115 provides a nominal AC voltage, such as 120V or 240V, and the rectifier 140 generates a DC voltage of about 400V on the intermediate bus capacitor 195.

In one example embodiment, the converter 145 includes a transformer 205 including a primary winding 205A, a secondary winding 205B, and an auxiliary winding 205C. In one example, the turns ratio of the primary winding 205A to the secondary winding 205B is about 15:14, and the turns ratio of the primary winding 205A to the auxiliary winding 205C is about 15:1. Resonant tanks 210, 215, and 220 are coupled to the primary winding 205A, the secondary winding 205B, and the auxiliary winding 205C, respectively. As illustrated in FIG. 2, the resonant tank 210 can include an inductor 210A and a capacitor 210B connected in series, the resonant tank 215 can include an inductor 215A and a capacitor 215B connected in series, and the resonant tank 220 can include an inductor 220A and a capacitor 220B connected in series. In one example embodiment, switching transistors 225, 230, 235, and 240 are coupled between the intermediate bus capacitor 195 and the resonant tank 210, and switching transistors 245, 250, 255, and 260 are coupled between the resonant tank 215 and a primary bus capacitor 265. The terminals of the primary bus capacitor 265 provide a battery interface 110A for coupling to the battery 110 (e.g., via fuses 270 and 275).

In some embodiments, the auxiliary winding 205C has a center tap, a diode 280 is coupled between the resonant tank 220 and an auxiliary bus capacitor 285, and a diode 290 is coupled between the center tap of the auxiliary winding 205C and the auxiliary bus capacitor 285. The terminals of the auxiliary bus capacitor 285 provide an auxiliary system interface 150A for coupling to the auxiliary system 150. The diodes 280, 290 rectify the signal present on the center tap of the auxiliary winding 205C. In some embodiments, the auxiliary winding 205C does not include a center tap, and additional rectifying devices would be used, such as a full bridge diode rectifier or a full bridge transistor rectifier for synchronous rectification.

The controller 200 controls the switching transistors 225, 230, 235, and 240 to transfer power to the primary bus capacitor 265, thereby controlling the DC voltage generated across the primary bus capacitor 265. The controller 200 controls the duty cycle and switching frequency of the switching signals to control the current signal applied to the primary bus capacitor 265. In some embodiments, the converter 145 generates a DC voltage ranging from about 240V to about 403V across the primary bus capacitor 265. For ease of illustration, connections between the controller 200 and the gate terminals of the switching transistors 225, 230, 235, 240, 245, 250, 255, and 260 are omitted. Also, feedback signals, such as voltage across the primary bus capacitor 265, battery current, and the like, used by the controller 200 are also omitted.

Current flowing through the primary winding 205A and the secondary winding 205B induces current in the auxiliary winding 205C. As described in greater detail below, when attached to the power source 115, the converter 145 uses power from the power source 115 to power the auxiliary system 150 through current induced in the auxiliary winding 205C by the primary winding 205A. When not attached to the power source 115, the converter 145 uses power from the battery 110 to power the auxiliary system 150 through current induced in the auxiliary winding 205C by the secondary winding 205B. In some embodiments, the voltage generated across the auxiliary bus capacitor 285 varies from about 9V to about 14.5V.

When the charger 105 is coupled to the power source 115, the converter 145 uses power from the power source 115 to supply current to charge the battery 110 and to power the auxiliary system 150. In some embodiments, the controller 200 implements a constant frequency, variable duty cycle technique for controlling the rectifier 140 to generate the voltage across the intermediate bus capacitor 195. The controller 200 can employ multiple modes for controlling the converter 145 to charge the battery 110. In some embodiments, the controller 200 employs a variable frequency, constant duty cycle technique for controlling the converter 145 to generate the voltage across the primary bus capacitor 265. A change in frequency changes the impedances of the resonant tanks 210, 215, and 220, which thereby changes current generated by the converter 145. Depending on the algorithm used for control, one or more of the resonant tanks 210, 215, and 220 may be omitted. For example, the resonant tank 210 may be used with the resonant tank 215 or the resonant tank 215, or both. The mode used by the controller 200 can depend on the voltage and current associated with the battery 110. In general, the controller 200 changes the frequency to change the current supplied to the battery 110 by the converter 145. For example, in a first mode, the controller 200 employs a constant current mode for controlling the converter 145 to charge the battery 110 when the voltage of the battery 110 is less than the target voltage. In some embodiments, the target voltage is about 403V and the constant current is about 18 A. As the voltage across the battery 110 increases, the controller 200 limits the power provided to the battery 110 to avoid a thermal overload condition. In some embodiments, the controller 200 employs a power threshold of about 6.6 kW in a second charging mode. When the power reaches the power threshold, the controller 200 reduces the current generated by the converter 145 to provide a constant power charging signal. As the voltage of the battery 110 approaches the target value, the controller 200 implements a third charging mode using a constant voltage approach. The controller 200 controls the current generated by the converter 145 to provide a relatively constant voltage at the target voltage across the primary bus capacitor 265 and the battery 110.

When the charger 105 is not coupled to the power source 115, the converter 145 uses power from the battery 110 to supply current to power the auxiliary system 150. Is this mode, the switching transistors 225, 230, 235, and 240 are not used, but the controller 200 activates the switching transistors 245, 250, 255, and 260 to generate a current in the secondary winding 205B that induces a current in the auxiliary winding 205C to generate a voltage across the auxiliary bus capacitor 285 to power the auxiliary system 150. Similar to the charging mode, the controller 200 can implement a variable frequency, constant duty cycle technique for controlling the switching transistors 245, 250, 255, and 260 to generate the voltage across the auxiliary bus capacitor 285. In some embodiments, controller 200 employs the multiple modes described above for controlling the switching transistors 245, 250, 255, and 260 for generating the voltage across the auxiliary bus capacitor 285. A change in frequency changes the impedances of the resonant tanks 215 and 220, which thereby changes current generated by the converter 145.

Figure 3:
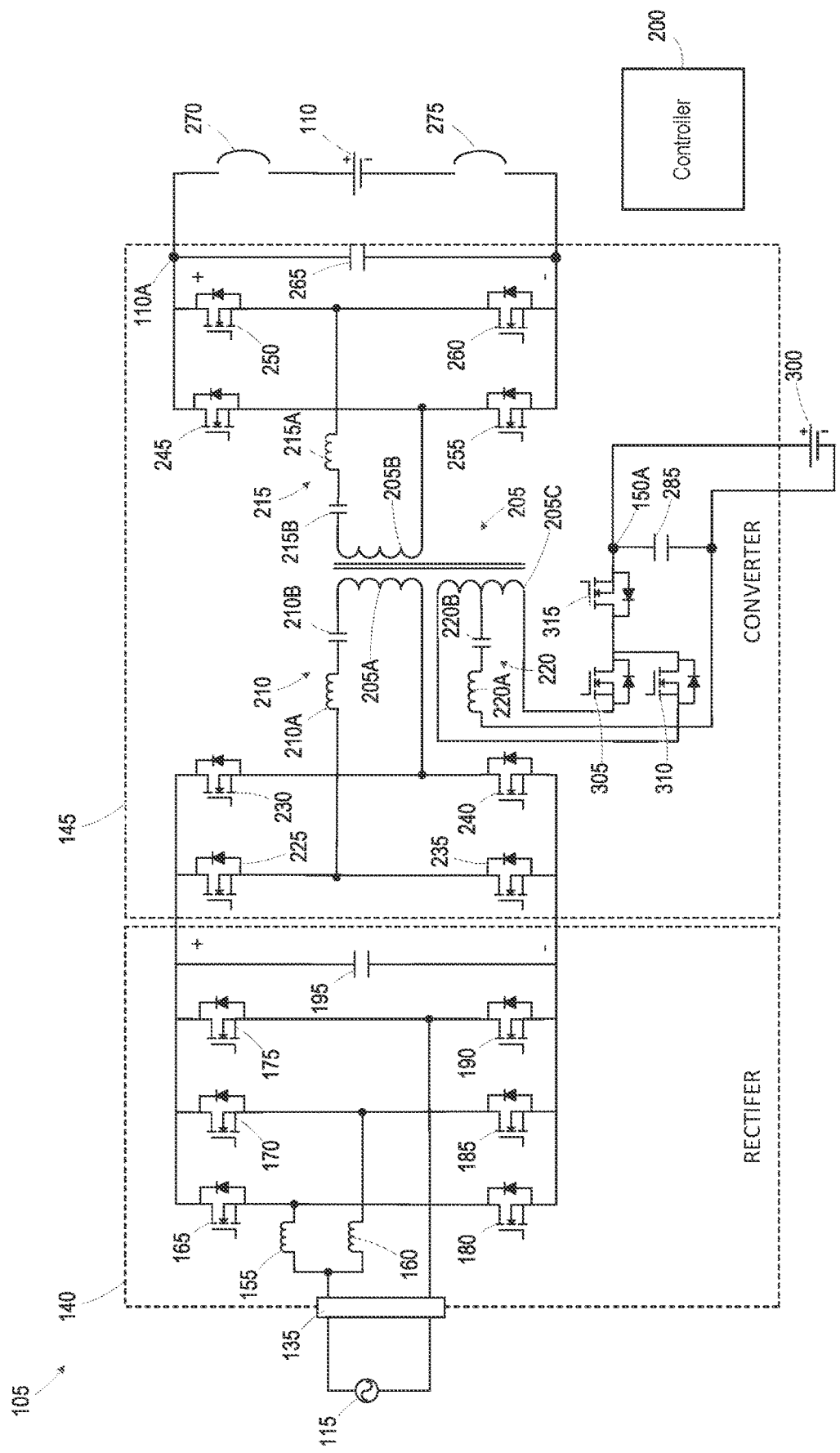
FIG. 3 is a circuit diagram of another embodiment of a charger included in the power supply system of FIG. 1 for charging a battery and providing an auxiliary power supply.

FIG. 3 is a circuit diagram of another embodiment of the charger 105 included in the power supply system 100 of FIG. 1 for charging the battery 110 and powering the auxiliary system 150. In FIG. 3, an auxiliary battery 300 is illustrated as being coupled to the auxiliary bus capacitor 285. The diodes 280 and 290 illustrated in FIG. 2 are replaced with transistors 305 and 310. The transistors 305 and 310 allow synchronous rectification to increase the efficiency of the charger 105 of FIG. 3 as compared to the charger 105 of FIG. 2. In some embodiments, a transistor 315 is placed in series with the auxiliary battery 300 to avoid overcharging or to tune the charging current provided to the auxiliary battery 300. For example, the controller 200 may control the duty cycle of the transistor 315 to tune the current when the charger 105 is coupled to the power source 115 and the controller 200 controls the current generated by the converter 145 based on the parameters of the battery 110.

The converter 145 described herein shares circuitry for charging the battery 110 with that for powering the auxiliary system 150. Hence, a separate power converter module is not required for generating the auxiliary voltage. This arrangement reduces the chip count and cost of the charger 105.

Various features and advantages of the invention are set forth in the following claims.

What is claimed is:
1. A charger comprising:
a charging interface;
a converter coupled to the charging interface, the converter comprising:
a first plurality of switching transistors coupled to the charging interface,
a transformer comprising a primary winding, a secondary winding, and an auxiliary winding, wherein the primary winding is coupled to the first plurality of switching transistors,
a second plurality of switching transistors coupled between the secondary winding and a battery interface, and
an auxiliary system interface coupled to the auxiliary winding;
a rectifier coupled between the charging interface and the first plurality of switching transistors, comprising an intermediate bus capacitor coupled to the first plurality of switching transistors; and
a controller configured to control the first plurality of switching transistors and the second plurality of switching transistors to generate a first signal at the battery interface and a second signal at the auxiliary system interface;
wherein the converter comprises:
a primary bus capacitor coupled between the second plurality of switching transistors and the battery interface; and
an auxiliary bus capacitor coupled between auxiliary winding and the auxiliary system interface.
2. The charger of claim 1, further comprising at least one selected from the group consisting of:
a first resonant tank coupled between the first plurality of switching transistors and the primary winding;
a second resonant tank coupled between the secondary winding and the second plurality of switching transistors; and
a third resonant tank coupled between the auxiliary winding and the auxiliary interface.
3. The charger of claim 1, wherein the converter comprises:
a first diode coupled between a first terminal of the auxiliary winding and a first terminal of the auxiliary bus capacitor; and
a second diode coupled between a second terminal of the auxiliary winding and the first terminal of the auxiliary bus capacitor, wherein a center tap of the auxiliary winding is coupled to a second terminal of the auxiliary bus capacitor.

4. The charger of claim 1, wherein the converter comprises:
a first transistor coupled between a first terminal of the auxiliary winding and a first terminal of the auxiliary bus capacitor, wherein the controller is configured to open the first transistor responsive to a voltage on the auxiliary system interface exceeding a first threshold; and a second transistor coupled between a second terminal of the auxiliary winding and the first terminal of the auxiliary bus capacitor, wherein a center tap of the auxiliary winding is coupled to a second terminal of the auxiliary bus capacitor.

5. The charger of claim 1, wherein the converter comprises:
a first transistor coupled in series with the auxiliary system interface, the first transistor having a body diode that blocks current flow to the auxiliary system interface.

6. The charger of claim 1, wherein the controller is configured to control the first plurality of switching transistors and the second plurality of switching transistors using a constant duty cycle and a variable frequency to control a current generated by the converter at the battery interface.

7. The charger of claim 6, wherein the controller is configured to control the current generated by the converter at a constant value responsive to a voltage at the battery interface being less than a first threshold.

8. The charger of claim 6, wherein the controller is configured to control the current generated by the converter to generate a constant voltage at the battery interface responsive to the voltage at the battery interface being greater than the first threshold.

9. The charger of claim 6, wherein the controller is configured to control the current generated by the converter to generate a constant power at the battery interface responsive to the power at the battery interface being greater than the first threshold.

10. The charger of claim 1, wherein the controller is configured to:
control the first plurality of switching transistors and the second plurality of switching transistors to transfer power from a power source coupled to the charging interface to generate the second signal at the auxiliary system interface; and
control the second plurality of switching transistors to transfer power from the battery interface to generate the second signal at the auxiliary system interface responsive to a power source not being coupled to the charging interface.

11. The vehicle comprising:
a charging interface;
a converter coupled to the charging interface, the converter comprising:
a first plurality of switching transistors coupled to the charging interface;
a transformer comprising a primary winding, a secondary winding, and an auxiliary winding, wherein the primary winding is coupled to the first plurality of switching transistors;
a second plurality of switching transistors coupled between the secondary winding and a battery interface; and
an auxiliary system interface coupled to the auxiliary winding;

a battery coupled to the battery interface;
an inverter coupled to the battery;
a motor coupled to the inverter;
a rectifier coupled between the charging interface and the first plurality of switching transistors, comprising an intermediate bus capacitor coupled to the first plurality of switching transistors; and
a controller configured to:
control the first plurality of switching transistors and the second plurality of switching transistors to generate a first signal at the battery interface and a second signal at the auxiliary system interface;
wherein the converter comprises:
a primary bus capacitor coupled between the second plurality of switching transistors and the battery interface; and
an auxiliary bus capacitor coupled between auxiliary winding and the auxiliary system interface.

12. The charger of claim 1, further comprising at least one selected from the group consisting of:
a first resonant tank coupled between the first plurality of switching transistors and the primary winding;
a second resonant tank coupled between the secondary winding and the second plurality of switching transistors; and
a third resonant tank coupled between the auxiliary winding and the auxiliary interface.

13. A vehicle comprising:
the charger of claim 1;
a battery coupled to the battery interface; and
an inverter between coupled between a motor and the battery.

14. The vehicle of claim 13, wherein the controller is configured to:
control, when a power source is decoupled from the charging interface, the first plurality of switching transistors and the second plurality of switching transistors in a manner that converts power from the battery into the second signal.

15. The vehicle of claim 14, wherein the controller is configured to:
control, when the power source is coupled to the charging interface, the first plurality of switching transistors and the second plurality of switching transistors in a manner that converts power from the power source into the second signal.

16. A method comprising:
controlling, by a controller in a manner that causes a charger to convert current from a power source into power at a battery interface and a voltage at an auxiliary system interface, a first plurality of switching transistors and a second plurality of switching transistors included in a converter; and
controlling, by the controller in a manner that causes the charger to convert the power from the battery interface into the voltage at the auxiliary system interface, the first plurality of switching transistors and the second plurality of switching transistors,
wherein the charger comprises:
the second plurality of switching transistors coupled between the battery interface and a secondary winding of the transformer,
the auxiliary system interface coupled to an auxiliary winding of the transformer,
a rectifier coupled between the charging interface and the first plurality of switching transistors, comprising an intermediate bus capacitor coupled to the first plurality of switching transistors; and wherein the converter comprises:
a primary bus capacitor coupled between the second plurality of switching transistors and the battery interface; and
an auxiliary bus capacitor coupled between auxiliary winding and the auxiliary system interface.

17. The method of claim 16, further comprising:
converting, by the charger when the charging interface is coupled to the power source, the current from the power source into the power at the battery interface and the voltage at the auxiliary system interface.

18. The method of claim 16, further comprising:
converting, by the charger when the charging interface is decoupled from the power source, the power from the battery interface into the voltage at the auxiliary system interface.

19. The method of claim 16, wherein the charger further comprises at least one selected from the group consisting of:
a first resonant tank coupled between the first plurality of switching transistors and the primary winding;
a second resonant tank coupled between the secondary winding and the second plurality of switching transistors; and
a third resonant tank coupled between the auxiliary winding and the auxiliary interface.

* * * * *